US012694799B2

(12) United States Patent
Stuart

(10) Patent No.: US 12,694,799 B2
(45) Date of Patent: Jul. 28, 2026

(54) 3-DIMENSIONAL ATOMIC STRUCTURE MODEL WITH MAGNETICALLY ATTACHED SUB-ATOMIC PARTICLE MODELS

(71) Applicant: Ian Douglas Stuart, Paddington (AU)

(72) Inventor: Ian Douglas Stuart, Paddington (AU)

( * ) Notice: Subject to any disclaimer, the term of this patent is extended or adjusted under 35 U.S.C. 154(b) by 946 days.

(21) Appl. No.: 17/891,159

(22) Filed: Aug. 19, 2022

(65) Prior Publication Data

US 2023/0069280 A1     Mar. 2, 2023

(30) Foreign Application Priority Data

Aug. 24, 2021     (AU) ................................. 2021221559

(51) Int. Cl.
| | |
|---|---|
| *G09B 23/20* | (2006.01) |
| *G09B 23/24* | (2006.01) |
| *G09B 23/26* | (2006.01) |

(52) U.S. Cl.
CPC ............. *G09B 23/20* (2013.01); *G09B 23/24* (2013.01); *G09B 23/26* (2013.01)

(58) Field of Classification Search
CPC ......... G09B 23/20; G09B 23/24; G09B 23/26
See application file for complete search history.

(56) References Cited

U.S. PATENT DOCUMENTS 25,476 A * 9/1859 Allen ..................... G09B 27/02

| | | | | | |
|---|---|---|---|---|---|
| 532,370 | A | * | 1/1895 | Gibbs | ..................... G09B 27/02 |
| 1,146,412 | A | * | 7/1915 | Early | ..................... G09B 49/02 |
| 2,485,064 | A | * | 10/1949 | Paclan | ..................... A63B 67/08 |
| | | | | | D21/456 |

(Continued)

FOREIGN PATENT DOCUMENTS

| | | | | | |
|---|---|---|---|---|---|
| AU | 2017200688 | B2 | * | 4/2022 | ............. G09B 23/20 |
| RU | 2558477 | C2 | * | 8/2015 | |

OTHER PUBLICATIONS

Bohr_Diagrams_of_Atoms_and_Ions_-_Chemistry_Libre Texts (Year: 2021).*

(Continued)

*Primary Examiner* — Jay Trent Liddle
*Assistant Examiner* — Selwa A Alsomairy
(74) *Attorney, Agent, or Firm* — Ingenium Patents LLC; Peter R Kramer

(57) ABSTRACT

The invention comprises an atomic structure kit for enabling students to understand how atoms are made of smaller sub-atomic particles, the architecture of these particles in relation to each other, and the forces acting upon the sub-atomic particles that hold an atom together. The kit comprises a central body representing an atomic nucleus attached to a shaft about which concentric circular or elliptical rings are rotatably attached. A plurality of bodies representing protons and neutrons is magnetically attachable to the atomic nucleus, and a plurality of bodies representing electrons is magnetically attachable to the rotatable rings. The properties and geometry of the magnetic materials mimic the strong localised force relationships between sub-atomic particles, specifically the electron-electron, proton-proton repulsion, the electron-nucleus attraction and the very strong attraction between the nucleons that bind the nucleus.

18 Claims, 9 Drawing Sheets

(56) References Cited

U.S. PATENT DOCUMENTS

| | | | | | |
|---|---|---|---|---|---|
| 3,107,439 | A | * | 10/1963 | Parr | G09B 23/26 |
| | | | | | 434/281 |
| 3,183,608 | A | * | 5/1965 | Jierree | G09B 23/26 |
| | | | | | 434/281 |
| 3,623,239 | A | * | 11/1971 | Nikolay | G09B 23/20 |
| | | | | | 446/259 |
| 9,463,394 | B2 | * | 10/2016 | Striggow | A63H 33/00 |

OTHER PUBLICATIONS

RU2558477C2_Translation (Year: 2015).*
Model_Of_Argon_atom (YouTube Video) (Year: 2019).*
Model_Of_Argon_atom (YouTube Video) screen capture (Year: 2019).*
Nucleon WIKI definition (Year: 2021).*

* cited by examiner

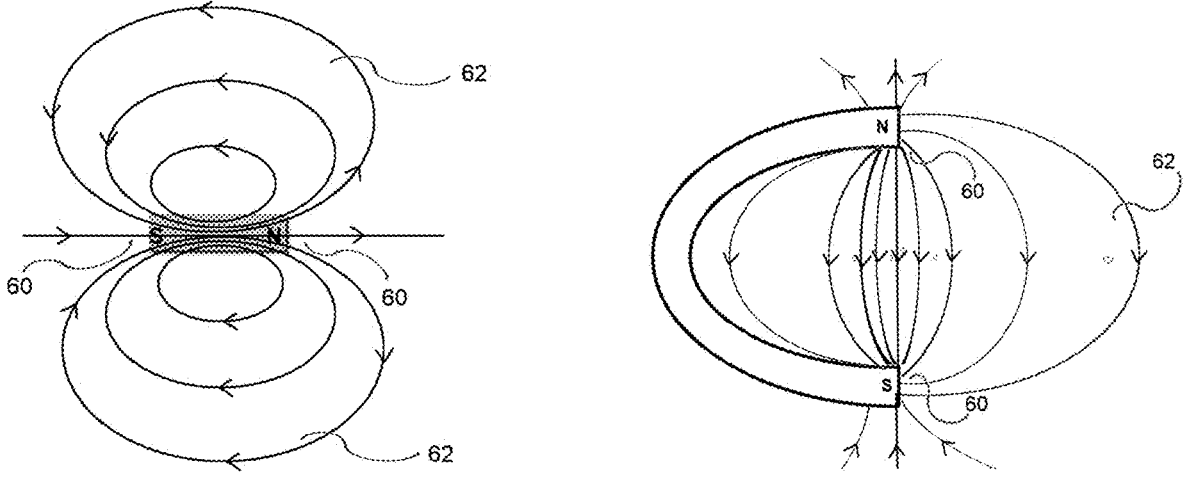
Figure 9
Figure 10
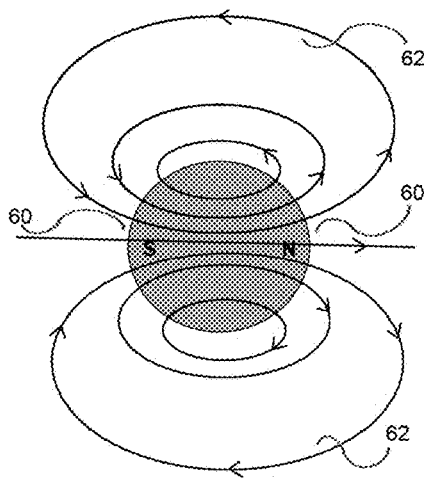
Figure 11

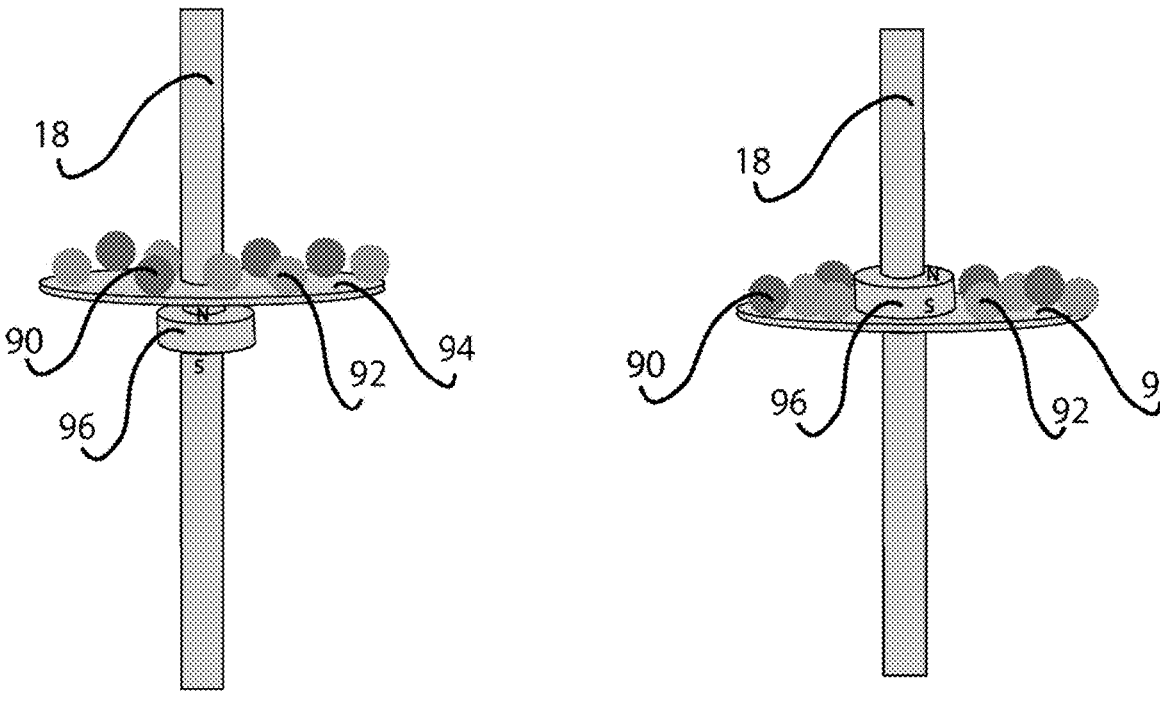
Figure 20                Figure 21
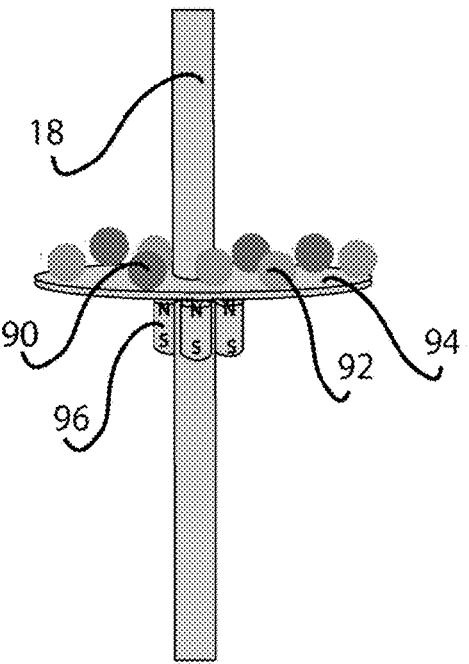
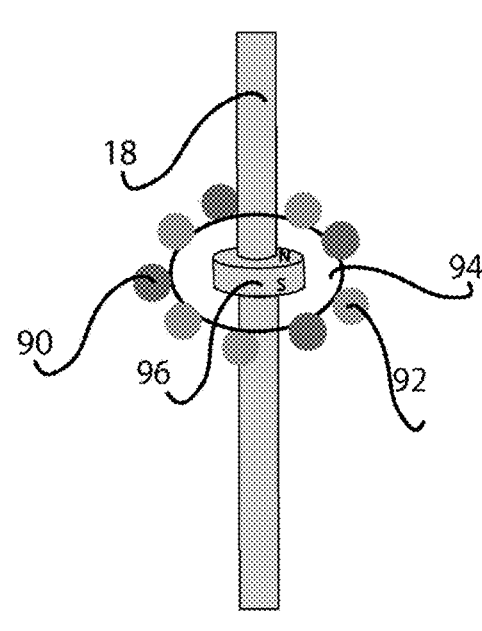
Figure 22                Figure 23

3-DIMENSIONAL ATOMIC STRUCTURE MODEL WITH MAGNETICALLY ATTACHED SUB-ATOMIC PARTICLE MODELS

FIELD OF INVENTION

This invention relates to the field of science education. More specifically the invention pertains to models of protons, neutrons and electrons to construct models of atoms and ions. Protons, neutrons and electrons are collectively known as "sub-atomic particles". Protons and neutrons are collectively known as "nucleons", and are found in the central nucleus of the atom. The atomic model being represented in this document shows positively charged protons and neutral neutrons bound together into a central nucleus by the strong nuclear force. In addition, the model shows negatively charged electrons orbiting the positively charged nucleus at various discrete energy levels, with the electrons bound to the nucleus by the electric attraction force due to opposite electric charges on the electrons and the nucleus. For the purposes of approximation, electrons occupy circular orbits of increasing radii from the atomic nucleus, depending on which energy value they possess. Even though electrons are not confined to precise orbital radii, their energy levels are precise, so representing their motion as orbiting the nucleus in specific circular orbits is a good approximation. Electrons with low energy occupy closer orbits, while electrons with more energy occupy farther out orbits.

BACKGROUND OF INVENTION

Science education has long used hands-on physical models to help students visualize how various physical systems work, especially if they are large-scale systems such as the Solar System, or small-scale systems such as atoms and molecules, both of which are difficult to examine at scales of normal human observation. Prior art models can be categorized into two types that illustrate how an atom is made from smaller sub-atomic particles—one category is a flat circular shape in 2-dimensions; a second category consists of spherical 3-dimensional "mobile" models that are suspended from a fixed point by a filament.

Background Art: 2-D Model Description. In a common embodiment, the atom is represented by a flat circular plastic base, with the nucleon models being placed in the central nucleus, and electron models placed in circles which represent different electron orbitals of varying radii from the center. One method of attachment of the subatomic models is by using their weight coupled with a shape that confines them gravitationally, such as a groove, lip or hole in the model frame. Sometimes a clear plastic lid is also placed over the particles to further contain them.

Another method employs flat cut-out "fridge-style" dispersed magnets as sub-atomic particles which are attached to a magnetic surface such as a white board. This method also represents electrons with smaller flat magnetic film circles, and attached to the whiteboard on circles centered on the nucleus drawn at varying radii from the nucleus. The magnetic aspect of the sub-atomic particles is mostly employed as a practical means of attachment, rather than to demonstrate an electrical or nuclear force associated with the particles, or the shape of the sub-atomic particles. This means that the flat 2-dimensionality of the overall atom model geometry is also extended to all the sub-atomic particles, which condenses their real-life spherical geometry into two dimensions.

2-D model shape problems: There are a number of problems associated with 2-dimensional type classroom models. Real atoms are 3-dimensional so a 2-dimensional representation is misleading. Typically the 2-dimensional model follows the "solar system" model in which electrons orbit around the central nucleus in a similar planar manner that planets orbit around the sun. Whereas the orbits of solar planets follow a roughly planar geometry; that is, all the planets are contained more or less within a single plane, real electron orbits utilize the full 3 dimensional space, and their orbital planes can intersect at varying angles. Real atoms have a 3-D shape, and are more like spheres than flat 2-D planes.

2-D model force-directionality problems: A further problem is that flat 2-D models use magnets, usually flat circular "fridge-magnets", as sub-atomic particles which are attached to an extended flat magnetic surface such as a whiteboard. The surface-to-surface contact means that magnetic attachment forces are not localized or directed towards a particular site within the atom model. The sub-atomic particle models could be repositioned to anywhere over the surface (e.g. whiteboard) with the same attractive force strength as they do at the point where the nucleus or electron orbital is located. A nucleon or an electron model stuck to a whiteboard surface could slide across the surface a great distance from the nuclear region, but still remain fully attached to the surface with equal force at all points. This is a misleading analogy for atomic forces which vary in strength, and are highly directed towards specific sites within the atom.

2-D model force-distance problems: A further problem with 2-D flat magnetic strips is that the attractive force is insufficiently sensitive to the separation distance between the two surfaces. When attaching or detaching a flat magnetic strip to or from an extended surface, the magnetic attractive force gets weaker as the particles (in this case, surfaces) are separated, though not by much. This is because the surface to which the sub-atomic models are attached, such as a whiteboard, is extended laterally in two dimensions, and exacerbated by the flatness of the sub-atomic strip magnet model which produces a uniform magnetic field as described herein with reference to FIGS. 8 and 9. However, real nuclear forces are highly separation-distance sensitive. A very small variation in the separation distance will make an exponentially large change in the strength of the attractive force between the particles. The strong nuclear force is described as a "short range force" because it is very strong when the particles are close, and dwindles to virtually zero as the particles separate even by a small amount. A similar issue applies to the electrons, which follow defined orbital paths to varying degrees of probability, and cannot be accurately represented by uniform magnetic forces that attach with equal strength distributed across the surface of the whiteboard. The attractive force between electron and nucleus, varies considerably at different distances from the nucleus, and the electron probability distribution displays strong preferences to particular regions, defined by the electron orbital.

Background art: 3-D "mobile" model description. This 3-dimensional mobile embodiment usually comprises hanging circular wires that represent electron orbitals from a filament attached to a high point, with each circular wire attached to the one below it by another filament. The nucleus model is also attached to the inner circle by a filament. These separate filament segments could be replaced by a single filament connecting all. The whole assembly can be described as a "mobile" because each circular ring orbital is free to rotate independently around the vertical axis of the filament in a similar (but not identical) way to the electrons in an atomic orbit, while the nucleus model remains in place. The attachment means of the nucleons and electrons does not use magnets, but rely on gravity or some sticking substance such as plasticine or sticky tape.

3-D "mobile" model shape problems: Atoms are spheres, not planes, and this type of model has the advantage of showing the 3-dimensionality of an atom. However, the axis of rotation of the electron models is restricted to the line of the suspension filament; that is, to a single axis. This means that the electron models can only rotate around the nucleus model in planar circles. This is an improvement over the 2-D models, but real electrons rotate around the nucleus in a spherical geometry, and occupy 3-dimensional space, in a similar (but not identical) way as bees might fly around a hive.

3-D Mobile force-directionality problems: 3-D mobile-type models do not use magnetic forces to represent the electric or nuclear forces within atoms. Instead, mobile-type models achieve this by contact forces due to some sticking agent such as plasticine or another sticky substance, or gravitationally by placing the sub-atomic particle models into a container. This means that the force of attraction needs to be mediated by an outside agent, that is, the user, directing the particle to the contact point, then squeezing them together, or moving the particle to a position where it will drop into place. Real atomic forces do not require this outside agency, and spontaneously attract and bond due to the net forces of attraction.

3-D mobile force-distance problems: Usually 3-D mobile-type models employ contact forces as attaching means for sub-atomic particle models. Contact forces have essentially zero strength with any separation distance, but maximum strength upon contact in which the particles are stuck together by an external force provided by the user. It is an all-or-nothing force. This is unlike real atomic forces in which they vary smoothly over varying separation distances, until they make contact or reach the equilibrium bond distance. If gravity is instead used as an attachment means, there is no attractive force at all between the sub-atomic particles and the nucleus. This is also unrealistic.

With the preceding in mind, it would be desirable to develop new approaches for physical modelling of atoms and sub-atomic particles thereof. It could be particularly desirable if the new approaches addressed one or more problems or challenges associated with existing 2D and/or 3D models such as those described above.

The reference to prior art in the background is not and should not be taken as an acknowledgement or suggestion that the referenced prior art forms part of the common general knowledge in Australia or in any other country.

SUMMARY OF THE INVENTION

An aspect of the present invention provides an atomic structure kit. Suitably, the kit is adapted to demonstrate that atoms are made of smaller sub-atomic particles, the architecture of these particles in relation to each other, and the forces acting upon the sub-atomic particles that hold an atom together.

In embodiments, the kit comprises a central body to which a plurality of bodies representing protons and neutrons are magnetically attachable to represent an atomic nucleus; and rotatable rings of varying radii to which bodies representing electrons are magnetically attachable. The geometry of the magnetic materials models, mimics, or approximates the geometry of the strong localized force relationships between nucleon particles, specifically with the strong nuclear force; as well as the repelling forces between electron particles.

In an embodiment, the kit is a kit for a 3-dimensional model for representing the structure of an atom, comprising: a shaft or filament; a body comprising a central magnetic body connected to the shaft or filament; and a plurality of concentric rings centres of which substantially coincide with the location of the central magnetic body, the rings connected to the shaft or filament such that the rings can substantially freely rotate around an axis of the shaft or filament; a plurality of bodies magnetically attachable to the central magnetic body to represent an atomic nucleus, each spherical body representing a proton and/or a neutron; and a plurality of bodies representing electrons magnetically attachable to the rings.

A related aspect of the invention provides an atomic structure model. Suitably, the model is adapted to demonstrate that atoms are made of smaller sub-atomic particles, the architecture of these particles in relation to each other, and the forces acting upon the sub-atomic particles that hold an atom together.

In embodiments, the model comprises a central body to which a plurality of bodies representing protons and neutrons are magnetically attachable to represent an atomic nucleus; and rotatable rings of varying radii to which bodies representing electrons are magnetically attachable. The geometry of the magnetic materials models, mimics, or approximates the geometry of the strong localized force relationships between nucleon particles, specifically with the strong nuclear force; as well as the repelling forces between electron particles.

In an embodiment, the model is a 3-dimensional model for representing the structure of an atom, comprising: a shaft or filament; a central magnetic body connected to the shaft or filament; a plurality of bodies magnetically attachable to the central magnetic body to represent an atomic nucleus, each body representing a proton and/or a neutron; a plurality of concentric rings centres of which substantially coincide with the location of the central magnetic body, the rings connected to the shaft or filament such that the rings can substantially freely rotate around an axis of the shaft or filament; and a plurality of bodies representing electrons magnetically attachable to the rings.

In at least certain preferred embodiments, kits and models according to aspects of the invention combine advantages and avoid disadvantages of prior art 2-D and 3-D models. In at least certain preferred embodiments, kits and models according to aspects of the invention avoid misleading 2-dimensionality of current flat models. In at least certain preferred embodiments, kits and models according to aspects of the invention avoid issues with uniform force distribution of "fridge-magnet" subatomic particle models attachment to the flat surface of 2-D models. In at least certain preferred embodiments, kit and models according to the invention avoid the misleading feature of existing 3-D models wherein sub-atomic particles are attached by contact forces instead of localized magnetic forces-at-a-distance.

BRIEF DESCRIPTION OF DRAWINGS

FIGS. 9, 10 and 11 show side and perspective drawings of three examples of "localized magnets", in which the magnetic field strength varies significantly with distance from the magnet. This means that the magnetic field line separations also vary significantly. These magnetic line patterns are used as attachment means for embodiments of the atomic structure model according to the invention, to achieve more realistic representation of electric or nuclear forces within atoms.

FIGS. 16 and 17 show proton models 84 with embedded magnets 88, facilitating polar attractions and repulsions, and with the magnets 88 positioned in cavities 86. Extensions of body material 82 secure the magnets. FIG. 18 shows a proton model 84 without an embedded magnet. FIG. 19 shows a neutron model 85 without an embedded magnet.

FIGS. 20, 21, 22, 23 and 24 show various arrangements of central magnetic bodies of embodiments of the atomic structure model according to the invention, comprising shafts 18, magnet(s) 96 and platform or band 94, wherein proton 90 and neutron 92 models are attached to platform or band 94.

DESCRIPTION OF EMBODIMENTS

Figure 1:
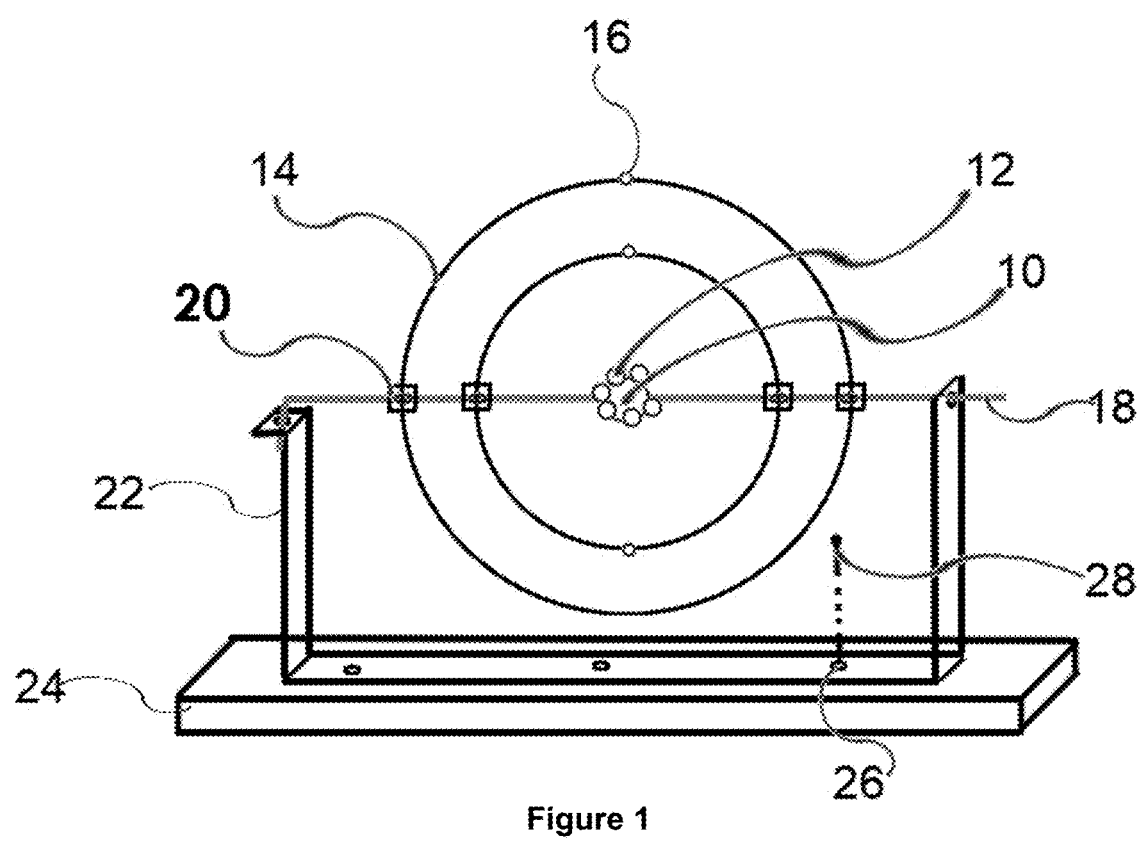
FIG. 1 is a side view that shows an overall schema of an embodiment of an atomic structure model according to the invention, showing a supporting frame which holds a horizontal shaft, which in turn holds a central nucleus body and rotatable rings to which electron models are attached.

Definition of Terms: The term "magnetic material" refers to a substance that is attracted to a magnet, or responds to an external magnetic field. A magnetic material is not itself necessarily a permanent magnet. Such materials include but are not limited to iron, nickel, cobalt, niobium and a few rare earth materials and their alloys.

The term "magnet" is a magnetic substance that has been magnetized to becomes a source of a permanent magnetic field. These include the above substance that have undergone a magnetizing process that aligns their magnetic domains. A magnet will attract another magnet according to the polarity rules: unlike poles attract; like poles repel. They will also attract a magnetic material such as iron by magnetic induction. They will also align to an external magnetic field if free to do so.

The term "localized magnet" refers to a magnet in which the North pole and South poles are positioned to produce a magnetic field whose field lines radiate in or out from the magnet at significant angles. For example, a horseshoe-shaped, or rod-shaped magnet, or a ball magnet will produce field lines that emanate away from the north pole in a radial fashion, and into the south pole in a radial fashion. The concentration of field lines, that is, the strength of the magnetic fields, are concentrated at the poles. The poles are regions that have stronger magnetic field strengths than at other points. Magnetic force interactions with magnetic materials will be stronger in the regions where the field lines are concentrated.

The term "dispersed magnet" refers to a magnet in which the magnetic field lines are uniform. For example, a magnetic film with poles on either side will produce magnetic field lines that emanate as parallel lines away from the north side, and as parallel lines into the south side. The magnetic lines do not congregate to concentrate regions of high magnetic field strength across the surface of the film. That is, one point on the surface of the film has the same magnetic strength as another.

Provided according to an aspect of the invention is an atomic structure model. Typically, the atomic structure model comprises a plurality of circular orbital rings comprising a magnetic material such as iron or steel, supported by a rigid shaft to which the rings are coupled, so that the rings can rotate freely about the shaft. Typically, the plurality of orbital rings surround a platform or similar containing a magnet-embedded localized nucleus. Exemplary embodiments of the nucleus arrangement are shown in FIGS. 20 to 25.

Electron models with embedded localized magnets (see, for example, FIGS. 12, 13 and 15), are magnetically attracted to, and can attach to, the magnetic rings. Magnetic nuclear models comprising magnetic material such as iron or steel are magnetically attracted to, and can attach to, the localized magnet-nucleus model (see, for example, FIGS. 20 to 25). The electron models are also embedded with small magnets so that they can attach to a magnetic material such as a steel wire circle representing the electron orbit. The directionality of the magnetic force to the orbital region is an approximate and useful analogue to the probability distribution of electrons within its orbital.

In some embodiments of the atomic structure model the magnetic material and magnets are reversed e.g. the orbital rings comprising the magnet with the electron models comprising of the magnetic material; and/or the nuclear models comprising the magnetic material and the nucleon models comprising of the magnets.

The localized magnets embedded into the electron models are arranged so that the same pole protrudes from the model, whereas the opposite pole is embedded so that the magnetic field strength is masked. This allows a net repulsive force to be exerted between any two electron models.

FIG. 1 shows an embodiment of an atomic structure model according to the invention in which the electron orbital rings 14 are constructed of magnetic material such as iron, and are supported by a horizontal rigid shaft 18 about which rings 14 can rotate. Each ring can rotate independently of each other ring. The rings 14 are attached to couplings 20 that thread onto the horizontal shaft 18 so that the rings can rotate about the shaft. The shaft 18 is supported by a U-shaped frame 22 screwed onto a base 24. The nucleus model 10 comprises a localized magnet, such as a strong neodymium rare earth magnet, within it so that it can attract nucleon models 12 which are made of magnetic material such as iron.

Figure 2:
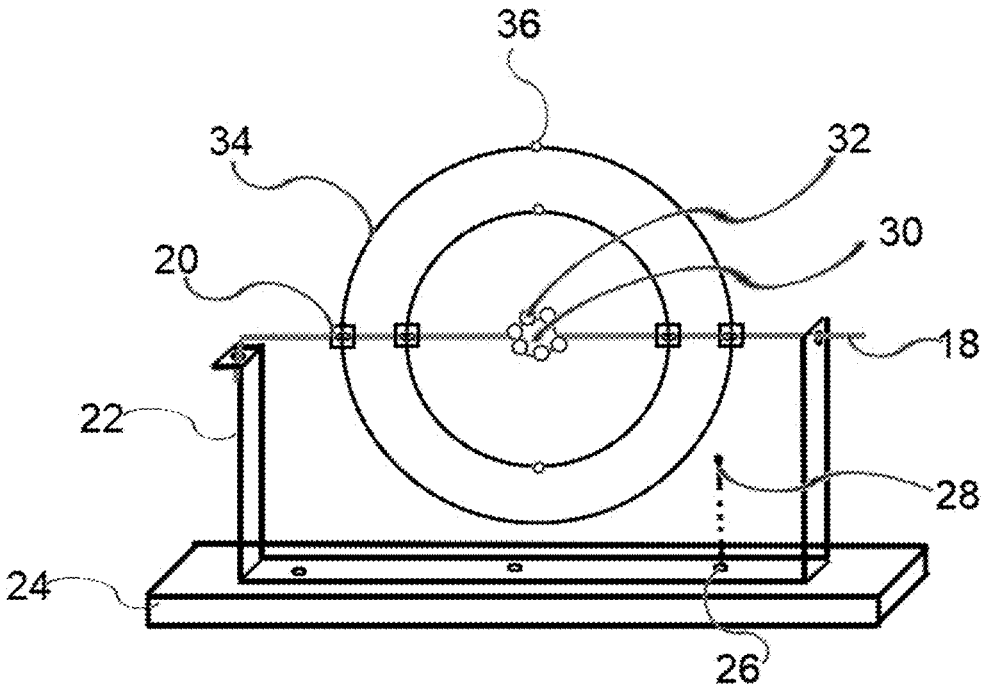
FIG. 2 shows another embodiment of an atomic structure model according to the invention. The FIG. 2 embodiment is similar to the FIG. 1 embodiment. However, the means of magnetic attachment between electron models and rings, and between nucleon models and nucleus model are reversed. This is explained in more detail in the description of embodiments section.

FIG. 2 shows an embodiment of an atomic structure model according to the invention. The FIG. 2 embodiment has similar structure as the FIG. 1 embodiment. However, in the FIG. 2 embodiment, the electron models 36 are made of magnetic material such as iron, whereas the orbital rings 34 are localized magnets. So instead of the electron models possessing a permanent magnetic field and creating the attraction to the rings as in the FIG. 1 embodiment, the rings of the FIG. 2 embodiment instead possess the permanent magnetic field and create the attraction to the electron models. A similar reversal occurs with the nucleons 32, which in the case of the FIG. 2 embodiment are localized magnets, and the nucleus model 30 is made of the magnetic material. The skilled person will readily appreciate that any suitable combination of magnet-magnetic material can be used to create electron ring and nucleon-nucleus attractions, and this principle applies to all subsequent embodiments.

Figure 3:
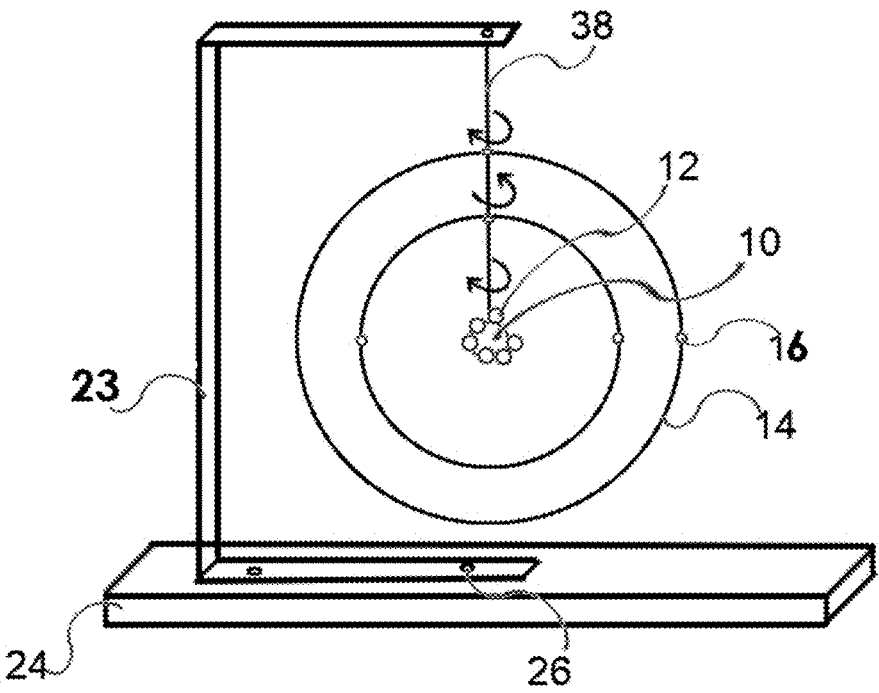
FIG. 3 shows a side view of another embodiment of an atomic structure model according to the invention, in which the rings are rotatable in a similar fashion as a hanging "mobile", using vertical filaments instead of a rigid shaft. However, the method of attachment of nucleons and electron models use localized magnetic forces rather than contact forces or gravity. This embodiment can allow for improved portability of the model.

FIG. 3 shows a side view of a mobile-type suspended embodiment of an atomic structure model according to the invention. In the FIG. 3 embodiment, orbital rings 14 rotate about a filament or thread 38 suspended from an upper point on a frame 23. Each ring can rotate independently of each other ring. The frame is screwed onto the base 24 at points 26.

Figure 4:
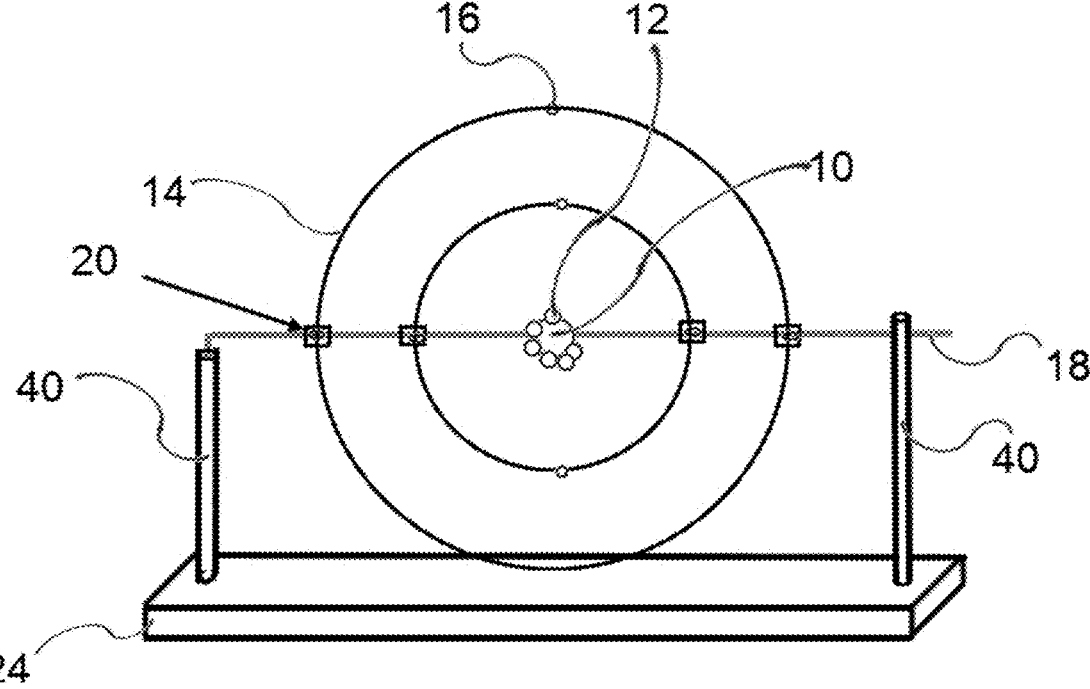
FIG. 4 shows a side view of another embodiment of an atomic structure model according to the invention, in which the holding shaft is supported by vertical posts rather than the frame.

FIG. 4 shows a side view of another embodiment of an atomic structure model according to the invention in which the shaft 18 is supported by two posts 40 which are embedded into the base 24.

Figure 5:
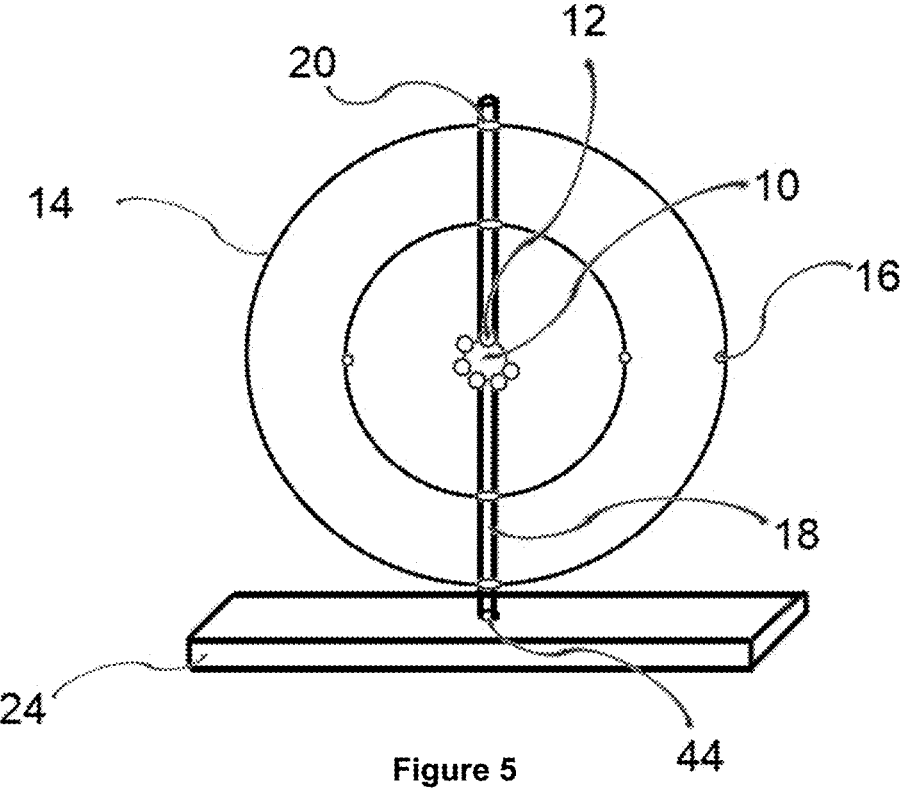
FIG. 5 shows a side view of another embodiment of an atomic structure model according to the invention, in which the holding shaft is held vertically by being embedded into a hole in the model base. This design avoids the necessity of holding the frame by posts or a frame.

FIG. 5 shows a side view of a preferred embodiment of an atomic structure model according to the invention, in which a vertical rigid shaft 18 is embedded into and supported by the base 24 at point 44. The orbital rings 14 are attached to the shaft by couplings or eyelets 20 that allow the rings to rotate. This embodiment avoids the need for a supporting frame.

Figure 6:
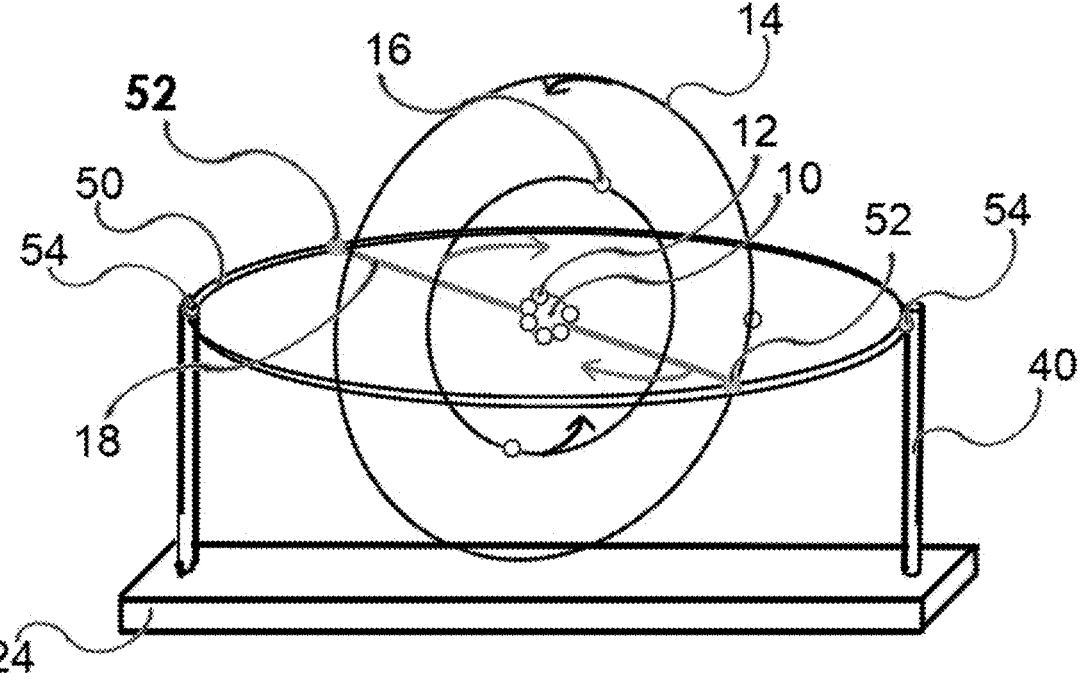
FIG. 6 shows a side view of another embodiment of an atomic structure model according to the invention, in which the rings are able to rotate around two perpendicular axes. This is achieved by mounting the holding shaft onto a circular rail mounted in a horizontal plane, whereas the rings can rotate about the axis of the shaft.

FIG. 6 shows a perspective-side view of another embodiment of an atomic structure model according to the invention. The FIG. 6 embodiment allows the orbital rings to rotate around two perpendicular axes. The orbital rings can rotate about the shaft 18, and the shaft can further independently rotate around the circular rail tracks, with bearings 52 located at each end of the shaft. This embodiment allows the electron to orbit around the nucleus in multiple dimensions, not confined to a planar circular pathway. A circular rail 50 is supported by posts 40 at points 54 and embedded into the base 24.

Figure 7:
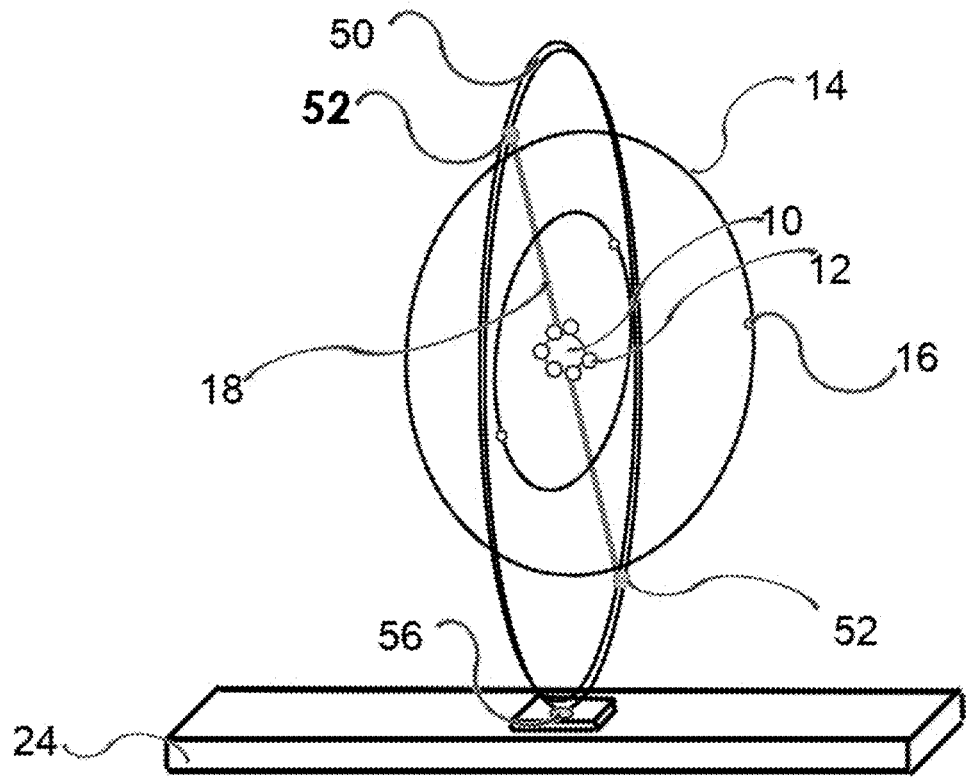
FIG. 7 shows a side view another embodiment of an atomic structure model according to the invention. The FIG. 7 embodiment is similar to the FIG. 6 embodiment, however the two perpendicular axes of the FIG. 7 embodiment are perpendicular to those of the FIG. 6 embodiment. In the FIG. 7 embodiment, the rail is oriented in a vertical plane and mounted directly onto the model base. This means that the rail and shaft do not require posts or a frame for support.

FIG. 7 shows a perspective-side view of another embodiment of an atomic structure model according to the invention. As for the FIG. 6 embodiment, the FIG. 7 embodiment allows the orbital rings to rotate around two perpendicular axes, although in a different orientation to that of the FIG. 6 embodiment. This advanced version also allows the electron to orbit around the nucleus in multiple dimensions, not confined to a planar circular pathway. A circular rail 50 is rigidly attached to the base 24 at point 56. The rail has a track that supports the rigid shaft 18, which in turn supports the orbital rings 14.

Figure 8:
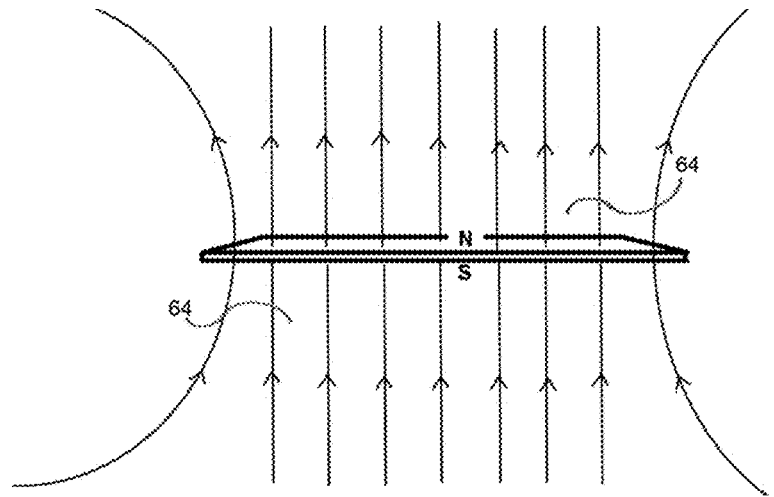
FIG. 8 shows an example of a "dispersed magnet" in which the magnetic field strength is more or less uniform with distance from the magnet, except at the edges where they converge to some extent. This shows the magnetic field pattern for a flat "fridge-magnet" type.

FIG. 8 shows a perspective-side view of a flat sheet magnet, or "dispersed magnet" similar to a "fridge magnet". The North and South poles are on either side of the magnet, and the magnetic field lines are generally uniform above and below the magnet surfaces. The magnet field strengths do not vary considerably along at various points located along the magnet surface, except at the edges. Further, the extended lateral shape of the flat magnetic strip means that the region of uniformity is relatively extended as well. The magnetic attractions are very similar at all points of contact between the magnet sheet and a magnetic material, such as a white board.

FIGS. 9, 10 and 11 show side views of 3 examples of localized magnets. FIG. 9 represents a bar magnet, FIG. 10 represents a horseshoe magnet, and FIG. 11 represents a spherical magnet. In each case, the magnetic field lines are convergent or divergent; that is, they are nonuniform. The magnetic force strengths of attraction vary considerably depending on where the magnets are located, and where the magnetic material are attached. For example, when a nucleon model made of a ball of iron is brought close to one end of a bar magnet, the magnetic attraction between the localized magnet and the iron ball increases exponentially as a function of the separation distance, and is directionally oriented towards the magnet. The iron ball will attach to a localized position of the magnet, rather than uniformly to the general region of the nucleus. Similarly, the electron model attracted will be directionally oriented towards the orbital ring, rather than being broadly attracted to the general region of the ring.

Figure 12:
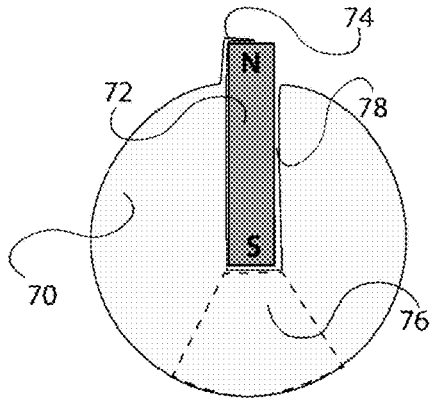
FIGS. 12, 13 and 15 show side drawings of electron models of embodiments of the atomic structure model according to the invention in which a localized magnet is embedded into a cavity.
Figure 13:
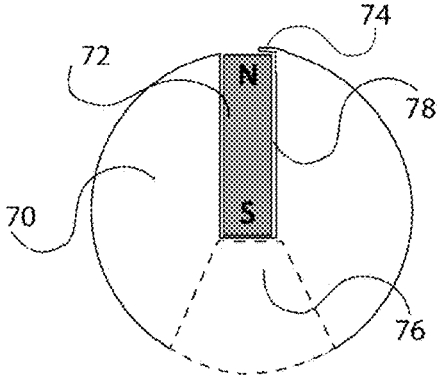
Figure 14:
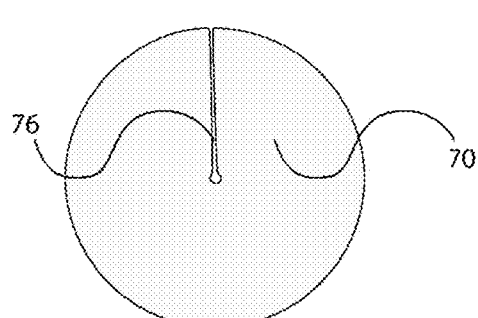
FIG. 14 shows an electron model in which it is friction-attached by a slot cut into the model.
Figure 15:
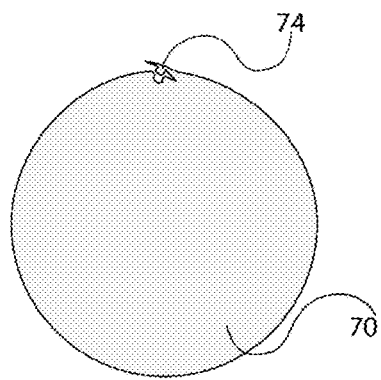
Figure 16:
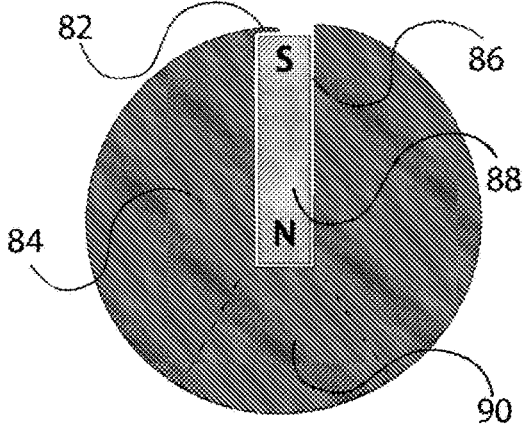
FIGS. 16, 17, 18 and 19 show nucleon models of embodiments of the atomic structure model according to the invention.
Figure 17:
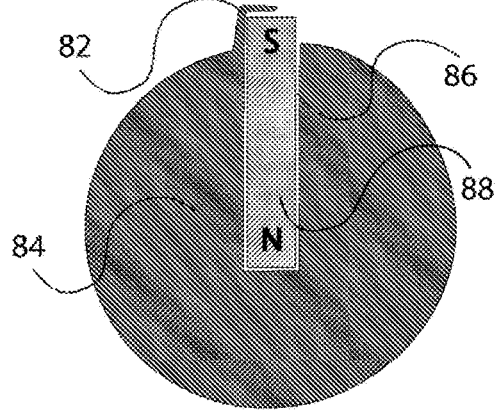

FIGS. 12 to 15 show side views of embodiments of electron models. In FIG. 12, the localized magnet 72 is embedded into the body of the electron model 70, housed within a cavity 74. In this embodiment, the North pole protrudes outside the body of the electron model, while the South pole is masked within the body of the electron model. Other variations are shown in FIGS. 13 and 15. FIG. 14 shows an electron model which is friction-attached by means of a slot, 76.

Certain advantages of at least typical embodiments of the atomic structure model according to the invention will now be described.

The present atomic structure model addresses shape problems: The current 3-D invention (along with certain existing 3-D mobile type models) has a compelling advantage over 2-D flat models, whether or not the latter employ either flat dispersed magnet films attached to a flat surface like a whiteboard, or non-magnetic spherical shapes to represent subatomic particles. Any 2-D representation of an atoms is problematic. 3-dimensionality is also important because students find it difficult to reconcile this 'skeletal' model of an atom comprised only of its internal sub-atomic particles being visible, with the 3-dimensional models of atoms in which only the 'surface' of the atom is visible, as in a solid ball. Normally the student learning progression moves from a 'solid' to the 'skeletal' model of an atom. Because this progression is a key step, it is useful to make these two versions as similar as possible. In other words, to shift from a 3-D solid ball model to a 2-D sub-atomic model is changing too many variables in a single shift; not withstanding that the 2-D model is also conceptually inaccurate. It is pedagogically preferable for students to compare a 3-D solid ball version with a 3-D sub-atomic skeletal version, so that the only difference is in the visibility of the atom's internal structure. If the dimensionality of the model also changes (from 3-D back to 2D), this adds an unnecessary confusion to the students' understanding. The use of localized magnets, as described herein with reference to FIGS. 8 and 9, also allows for 3-D sphericity in the shape of the sub-atomic particles which, like the atom overall are also spherical. The double-axis embodiments of the present 3-D invention, as shown in FIGS. 6 and 7, are also superior to existing 3-D mobile models in terms of representing electron motion around the nucleus. Whereas existing 3-D mobile models restricts the rotation of the electron orbitals to one axis of rotation—that of the filament—the present 3-D model allows for rotation about two perpendicular axes, which means that the motion of the electron model about the nucleus can be expanded to 3 dimensions, which is a more realistic representation of how real electrons orbit about the nuclei.

The present atomic structure model addresses force-directionality problems: The force directionality problem with the 2-D flat magnet film type model has been discussed above, in which the flat dispersed magnets whose surfaces attach with uniform force as they are shifted sideways across the white board surface, display no preferential force of attachment to the nucleus region in the case of the nucleons, or to the orbital rings in the case of the electron models. Existing 3-D mobile type models also suffer directionality problems, as the sub-atomic particle models need to be shifted into place, and attached to a sticky substance, then by an external pressing force applied by the user. In other words, there is no inherent force directionality at all without guidance from the user. Indeed, the 3-D mobile type model implies not internal atomic forces-at-a-distance at all. Real atomic nuclei employ a highly localized strong nuclear force to bind the nucleons together, or a nucleon to the existing nucleus, in which the nuclear attractive force is highly directed between two points—the nucleon and the nucleus. A similar force directionality to real atoms is achieved with the present invention because a localized magnet, in which a magnetic material in the geometry of a point, or confined sphere, is attracted to another point, the nucleus-magnet. The present invention also addresses the directionality problem for the electron models, as the localized electron model is specifically attracted to, and attaches to, the magnetic orbital rings. It also addresses the 3-D mobile model type problem, as the magnetic attractions spontaneously attract, and cause attachment, of the sub-atomic particles to their sites on the model without requirement of an external force, except for the original positioning. The lack of effort in binding nucleons to the nucleus more accurately reflects how nuclei actually form in real atoms. In the case of the electrons, orienting the same magnetic pole of the embedded magnet in identical fashion for all electron models will create a net repulsive force between them. For example, if the North pole protrudes to the outside of the embedding material out of which the electron model is composed, while the South pole is embedded and its magnetic field strength is masked at this pole, then the North pole will dominate in any electron-electron interaction, creating a repelling effect. This mimics the repulsive force of interaction between electron-electron pairs as all electrons carry a negative charge. The point-to-point directionality of this force will also be preserved.

How the present atomic structure model addresses force-distance issues: In the case of the 2-D type model, the force required to pull apart the flat fridge magnet surface from the white board surface is not very sensitive to the separation distance of the surfaces, as a result of the uniform magnetic field patterns associated with flat dispersed magnetic films, and because the magnets are attached to a flat 2-D surface e.g. a whiteboard. However, the nucleon models in the present atomic structure model are attached specifically to, and directed towards, the nuclear region by a localized magnet, in a similar way that the nucleons are contained within the nucleus by a localized strong nuclear force. Force-wise, pulling a nucleon model away from the nucleus model is similar to pulling a nucleon away from the nuclear region, if localized magnets are used. The initial effort is relatively high, but once the nucleon is free from the nucleus, only minimal force is required to fully detach it. This means that the magnetic force of attraction between a localized magnet (especially a strong one like a rare earth magnet) within the nucleus model and a magnetic particle/nucleon is highly sensitive to separation distance. When the particles are close, the magnetic force is very strong because the magnetic field strength is high close to the magnet, but as they are pulled apart, this force diminishes in strength exponentially as the magnetic field strength fades away. This is a better analogue to both electric and nuclear forces of attraction within atoms. Electric forces vary inversely with the square of the distance of separation of the electric charges, showing that the force is disproportionately sensitive to separation distance. In the case of the strong nuclear force, this relationship to separation distance is even more sensitive. Existing 3-D mobile type models have an even more serious flaw in their representation of the force-distance relationships because they rely upon the user to physically guide and press the sub-atomic particle models onto the corresponding sites. Because the binding process is accomplished through the effort of the user, the model suggests that there are no internal attractive forces of attraction within atoms at all. The is superior in showing that the attractive force gets much stronger as the sub-atomic particles get closer to their target sites, and that the binding processes within atoms are spontaneous and effortless. Nucleons do not need to be 'squeezed' and stuck together by an external agent, and no analogue for such an agent exists within real atoms. All that is required is that the nucleons be proximate, and the natural attractive nuclear force will take over to bind them together. A similar situation exists with electrons that spontaneously and effortlessly attach to atoms through the electric attractive force between oppositely charged particles. No external agent is required. Rather than requiring energy, binding an electron to form an atom instead releases energy, that is, it is an exothermic process, not an effortful endothermic process.

Other benefits of the present atomic structure model: A further advantage of the present model using localized magnetic forces is that the attachments do not require fine motor skills that younger students often do not possess. Attaching is also instantaneous and more fun so are pedagogically more engaging. Because the user kinesthetically 'feels' the attractive forces during attachment and detachment (and repulsions with electron-electron interactions), along with their sensitivity to distance of separation and directionality, learning outcomes are more meaningful. For example, the spontaneous exothermic nature of attaching a nucleon to the nucleus is more understandable if the student can physically feel the models attaching effortlessly. Conversely, the effortful endothermic nature of detaching a nucleon is more understandable if the student needs to physically overcome the magnetic attractions to separate the particles in a hands-on way. The force directionality and distance sensitivity are likewise understood kinesthetically with the localized magnetic forces involved. Kinesthetic learning is acknowledged to be one of the three key modalities of learning: the other two being the visual and auditory modes.

A key to components in the figures is provided as follows. Note that the numbers used in a figure apply to all subsequent figures, unless otherwise indicated.

Figure 18:
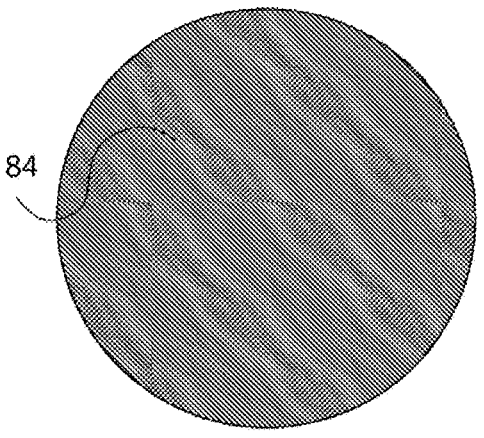
Figure 19:
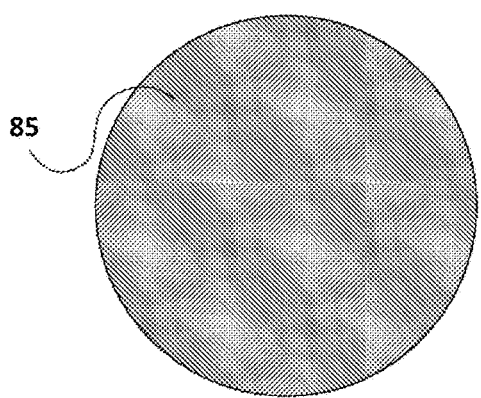
Figure 24:
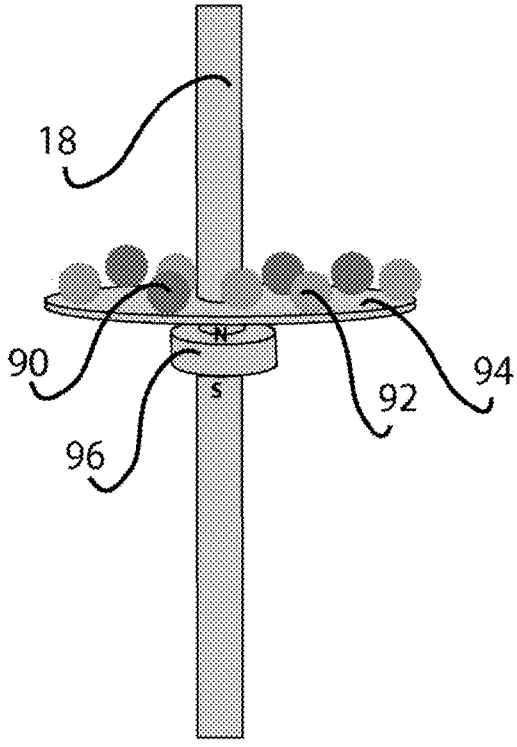
Figure 25:
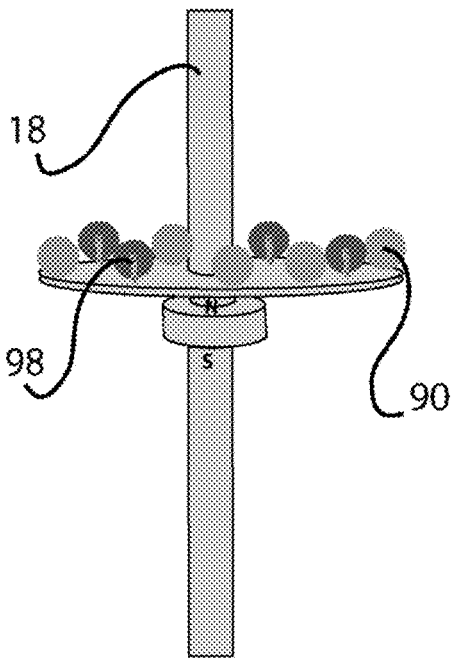
FIG. 25 shows an arrangement of proton and neutron models attached to a central magnetic body of an embodiment of the atomic structure model according to the invention, wherein the proton models comprise embedded magnets.

FIG. 1
10 nucleus model (localized magnet)
12 nucleon model (magnetic material)
14 orbital rings to which electron models are attached (magnetic material)
16 electron model (localized magnet)
18 rigid shaft to support orbital rings
20 orbital ring-shaft coupling
22 rigid frame
24 base
26 hole for screw
28 screw
FIG. 2
30 nucleus model (magnetic material)
32 nucleon models (localized magnets)
34 ring orbitals (localized magnets)
36 electron models (magnetic material)
FIG. 3
38 filament to suspend ring orbitals
FIG. 4
40 posts to support shaft
FIG. 5
18 vertical shaft
44 attachment means of shaft to base (e.g. screw and thread)
FIG. 6
50 circular ring rail to support shaft 18 mobile in horizontal plane
52 attachment means of shaft to rail e.g. wheel or bearing and rut
54 attachment means of circular rail to supporting posts
FIG. 7
50 circular ring rail to support shaft 18 mobile in vertical plane
56 attachment means of circular rail to base
FIG. 8
64 uniform magnetic field of flat magnet
FIGS. 9 to 11
FIG. 9 represents a bar type magnet
FIG. 10 represents a horseshoe type magnet
FIG. 11 represents a spherical ball type magnet
60 region of strong magnetic field strength
62 region of weak magnetic field strength
FIGS. 12 to 15
70 body of electron model 72 in FIGS. 12 and 13 embedded localized magnet, with the North pole protruding for all electron models, while the South pole is located within the body of the electron model.
78 in FIGS. 12 and 13 cavities to embed localized magnet In this specification, the indefinite articles "a" and "an" are not to be read as singular indefinite articles or as otherwise excluding more than one or more than a single subject to which the indefinite article refers. For example, "a" shaft includes one shaft, one or more shafts, and a plurality of shafts.

In this specification, the terms "comprises", "comprising", "includes", "including", and similar terms, are intended to denote the inclusion of a stated integer or integers, but not necessarily the exclusion of another integer or other integers, depending on context. That is, a product, composition, or method, etc., that comprises or includes stated integer(s) need not have those integer(s) solely, and may well have at least some other integers not stated, depending on context.

In this specification, terms such as "above" and "below"; "front" and "back"; "top" and "bottom"; "left" and "right"; "horizontal" and "vertical", and the like, may be used for descriptive purposes. However, it will be understood that embodiments can potentially be arranged in various orientations, and that such relative terms are not limiting and may be interchangeable in appropriate circumstances.

In this specification, unless the context requires otherwise, the terms "connection", "connected", "connecting", and the like, are not to be read as limited to direct connections and may also include indirect connections. For example, unless the context requires otherwise, a stated first component "connected" to a stated second component may be connected via, through, or by, one or more unstated components.

I claim:

1. A 3-dimensional model for representing a structure of an atom, the model comprising;
  a shaft or filament;
  a central magnetic body connected to the shaft or filament;
  a first plurality of bodies magnetically attachable to the central magnetic body to represent an atomic nucleus, each of the first plurality of bodies representing a proton and/or neutron;
  wherein the central magnetic body is a magnetically active body that is structurally distinct from the first plurality of bodies representing the proton and/or the neutron, and to which the first plurality of bodies representing the proton and/or the neutron are magnetically attachable;
  a plurality of concentric rings centres of which coincide with a location of the central magnetic body, the rings connected to the shaft or filament such that the rings can freely rotate around an axis of the shaft or filament; and
  a second plurality of bodies representing electrons magnetically attachable to the rings.

2. The model of claim 1, wherein the shaft or filament is a shaft.

3. The model claim 2, wherein the central body is centrally attached to the shaft.

4. The model of claim 2, wherein movable mounting of the shaft allows for rotation of the rings about two perpendicular axes.

5. The model of claim 4, wherein the shaft is movably mounted to a circular rail at mounting positions at or towards first and second ends of the shaft.

6. The model of claim 5, wherein the circular rail is in a horizontal plane.

7. The model of claim 5, wherein the circular rail is in a vertical plane.

8. The model of claim 1, wherein the shaft or filament is a filament.

9. The model of claim 8, wherein the central body is attached at or towards an end of the filament.

10. The model of claim 1, wherein each of the first plurality of bodies representing the proton and/or neutron that are attached to the central body are spherical bodies.

11. The model of claim 1, wherein the second plurality of bodies representing electrons make polar repulsions against each other.

12. The model of claim 1, wherein the first plurality of bodies representing protons make polar repulsions against each other.

13. The model of claim 1, wherein the first plurality of bodies representing protons make polar attractions to the second plurality of bodies representing electrons.

14. The model of claim 1, wherein the first plurality of bodies representing protons make polar attractions to the central body.

15. The model of claim 1, wherein the first plurality of bodies representing the protons and/or the neutrons are spheroid bodies, and wherein the second plurality of bodies representing the electrons are spheroid bodies.

16. The model of claim 1, wherein the 3-dimensional model is used for teaching atomic structure.

17. A kit for a 3-dimensional model for representing a structure of an atom, the kit comprising:
- a shaft or filament;
- a body comprising a central magnetic body connected to the shaft or filament; and

- a plurality of concentric rings centres of which coincide with a location of the central magnetic body, the rings connected to the shaft or filament such that the rings can freely rotate around an axis of the shaft or filament;
- a first plurality of bodies magnetically attachable to the central magnetic body to represent an atomic nucleus, each spherical body representing a proton and/or a neutron;
- wherein the central magnetic body is a magnetically active body that is structurally distinct from the first plurality of bodies representing the proton and/or the neutron, and to which the first plurality of bodies representing the proton and/or the neutron are magnetically attachable;
- a second plurality of bodies representing electrons magnetically attachable to the rings.

18. A method of assembling a model for representing a structure of an atom, including steps of:
- a) connecting a central magnetic body to a shaft or filament;
- b) connecting a plurality of concentric rings with the shaft or filament such that centres of the rings coincide with a location of the central body, and the rings can freely rotate around an axis of the shaft or filament;
- c) magnetically attaching a first plurality of bodies to the central body wherein the central body is a magnetically active body that is structurally distinct from the first plurality of bodies wherein each of the first plurality of bodies represent a proton and/or a neutron,
- d) magnetically attaching a second plurality of bodies representing electrons to the plurality of concentric rings.

* * * * *